Feb. 27, 1934.   H. F. FLOWERS   1,949,120
DUMP VEHICLE WITH ACTUATED DOORS
Filed April 8, 1926   2 Sheets-Sheet 1

Inventor
Henry Fort Flowers
By
Sturtevant & Mason
Attorneys.

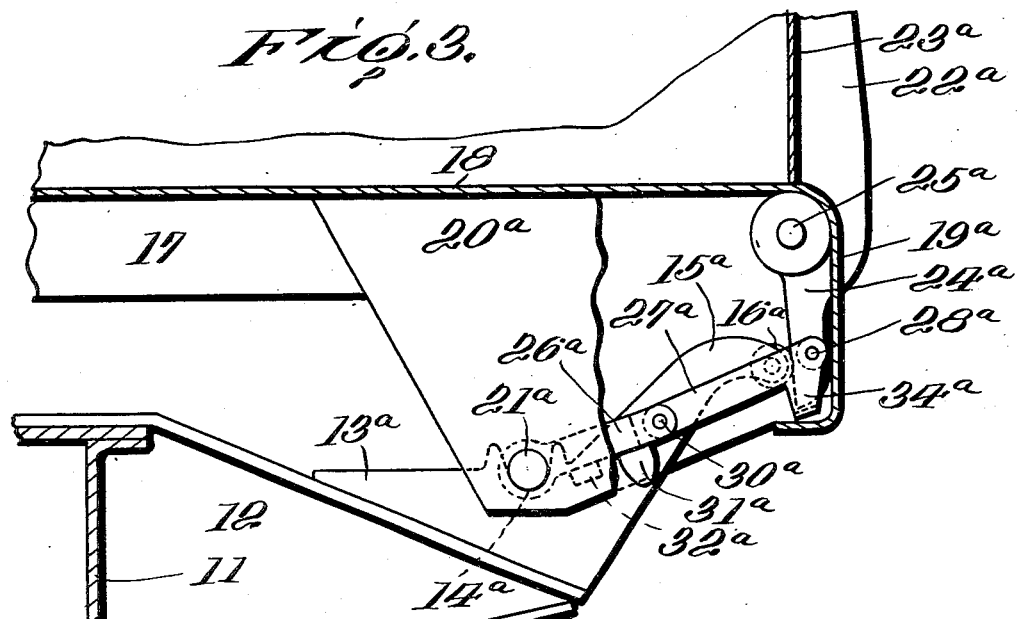
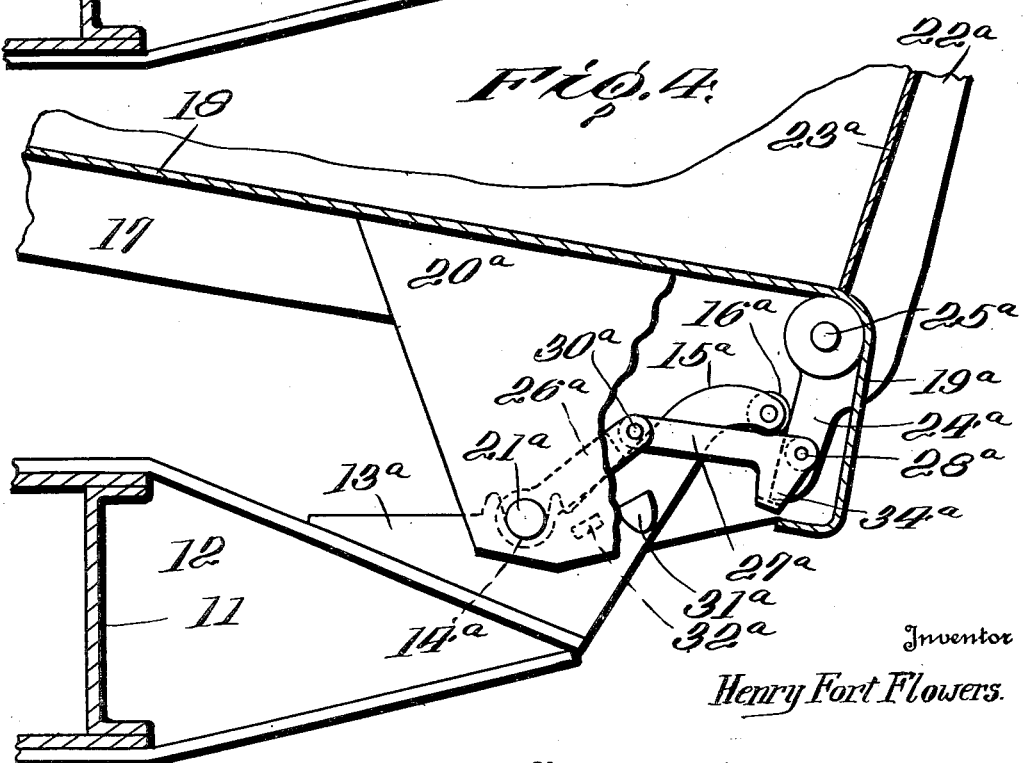

Patented Feb. 27, 1934

1,949,120

UNITED STATES PATENT OFFICE 1,949,120

DUMP VEHICLE WITH ACTUATED DOORS

Henry Fort Flowers, Findlay, Ohio

Application April 8, 1926. Serial No. 100,576

31 Claims. (Cl. 105—276)

This invention relates to improvements in actuating mechanisms for the doors of vehicles, and is particularly adapted to such vehicles which are adapted to dump to either side.

In my copending applications, Serial Nos. 740,307, filed Sept. 27, 1924, now U. S. Patent 1,611,012; 66,791, filed Nov. 4, 1925, and 79,371, filed Jan. 5, 1926, vehicles of such types have been shown which are adapted for dumping to either side, and in which the doors are positively actuated during the return movement of the body from tilted to the normal transport position, so that the door is positively closed. Further, in each instance, means are provided for locking in closed position both doors during normal transport and the door at the upper side of the body while tilting and returning from tilted position.

According to the present invention, such a door actuating and locking system is set forth, in which the transverse bars or links which extend across the underframe of the vehicle in the aforesaid disclosures are dispensed with, and the door actuation is secured by the use of members projecting from the underframe into operative relation with the doors, and means are provided whereby the doors are locked in a closed position during transport by the cooperation of the door closing mechanism above referred to and a linkage system which is adapted to positively hold the door when the body is tilted toward the opposite side.

Another object of the invention is to provide such a door operating mechanism in which the door is permitted a free movement in case it encounters an obstacle such as a stone during the tilting movement of the body and the opening movement of the door.

A further object of this invention is to provide means whereby the door is caused to cooperate with the actuating mechanism, so that the door begins to open at the moment that the body starts to tilt, regardless of the force of gravity acting upon the door.

In the drawings:

Figure 1 is a section through a vehicle embodying such a door controlling mechanism, the body being represented in the tilted position.

Fig. 2 is a similar view, with the body in the normal or transport position.

Fig. 3 is a section on a larger scale of one of the door controlling mechanisms, with the body in the normal transport position.

Fig. 4 is a similar view, representing the body in slightly tilted position, and setting forth the means by which the door is positively controlled against too rapid an opening, and is positively returned to its closed position during the return of the body.

It will be understood in all of these figures that although the vehicle represented is a railroad car with a standard underframe, that the invention is not solely applicable thereto but may be employed with any type of vehicle, whether supported by wheels, runners, etc., and whether used on rails or roads.

In these drawings, the wheels 10 are understood to have suitable trucks to support an underframe 11. This underframe 11 has the transverse brackets 12 extending on either side thereof. These brackets at their outer ends carry the supporting plates 13 and 13ª which have on their upper surfaces the sockets 14 and 14ª to receive the supporting trunnions for the dump body. The plates 13 and 13ª respectively project beyond the line of these trunnions and present the arms 15 and 15ª which carry the antifriction rollers 16 and 16ª at their outer ends.

The dump body comprises the supporting framework 17 which has the apron or bed plate 18 of the dump body securely fastened thereto. The bed plate is bent over at either side to form the flanges 19, 19ª which constitute longitudinally stiffening members for the entire body. At intervals along the lower side of the body and in cooperative relation with each of the plates 13, 13ª are provided the gusset plates 20, 20ª which carry the fulcrums or trunnions 21, 21ª thereon, which by resting in the sockets 14, 14ª support the body in stable equilibrium during normal transport.

The flanges 19, 19ª of the body are slotted at intervals for the passage of the door stiffening irons 22, 22ª which support the door plates 23, 23ª. Each of these irons 22, 22ª has a projecting finger 24, 24ª formed integrally therewith which projects downward from the pivotal support 25, 25ª of the respective door upon the framework 17. Toggle levers constituted of links 26, 27 and 26ª, 27ª are each pivotally mounted at their inner end at each of the respective trunnion axes 21, 21ª and pivoted at their outer end to the depending finger 24 or 24ª of the door. The two sections 26, 27, and 26ª, 27ª are jointed together at the intermediate point of the toggle lever 30, 30ª. A striking lug 31, 31ª is provided on each of the arms 15, 15ª in the path described by the toggle link 26 or 26ª during the rocking movement of the dump body about the respective trunnion 21 or 21ª. A similar supporting lug 32, 32ª is formed upon the gusset plate and is adapted to hold the respective toggle lever in an extended end position when the respective side of the body is raised away from the supporting plate 13 or 13a.

It is preferred to form at least the outer member 27, 27a of the toggle lever in double, and to connect the two portions thereof by an integral U-shaped stirrup 34, 34a which, as shown in the figures, has a depth sufficient to permit the free end of the respective finger 24, 24a to be received therein in the closed or normal transport position of the door and the body.

The body has the usual ends 40.

The method of operation of this device is as follows:

The vehicle being in the position shown in Fig. 2, a load of material is placed on its floor or bed plate 18 and the vehicle may be transported from the loading station to any desired discharging station. During this normal transport, the rollers 16, 16a rest against the fingers 24, 24a of the doors and hold the latter securely closed: since the trunnions 21, 21a are widely spaced from the longitudinal axis of the vehicle, the dump body is in stable equilibrium, and acidental dumping cannot occur.

Upon arriving at the discharging station, one side of the vehicle is caused to be raised with respect to the respective side of the underframe by some means not shown: this may either be a self-carried power unit of the type shown in my copending applications Ser. Nos. 740,307 and 66,791, or it may be a raising device located along the right of way as shown in my copending application Ser. No. 79,371. Since the present invention is not concerned with the particular means of raising or tilting, it has not been represented, and need not be described in greater detail than by a reference to the aforesaid applications.

As the one side of the body is raised, for example, the right side in Figs. 1 and 2, the body 17, 18 tilts about the trunnion axis 21 which is supported on the plates 13. During the first stage of the downward movement of the respective side of the body, the link 26 encounters the striking lug 31 on the arm 15, which holds the link 26 fast against further movement with the dump body and causes it to exert a drag upon the link 27, which by its pivotal engagement 28 with the finger 24, pulls inward on the latter and causes the door irons 22 and plate 23 to be rocked outwardly and downwardly about the pivot 25, so that the door is given a preliminary movement toward opening at the first movement of the body to tilting position. The door, however, is prevented from falling to a fully open position, regardless of the toggle links 26, 27 which no longer exert a retaining force upon it, by the engagement of the inner surface of the finger 24 with the antifriction roller 16 carried by the outer end of the arm 15. As the body continues to tilt, the door is gradually permitted to open under the action of gravity due to its own weight and the weight of the load which gradually comes upon it as the body tilts, to an extent determined by the shape of the rear surface of the finger 24 and the position of the roller 16 with respect to the pivot points 25 and 21. If the door 22, 23, encounters a stone or other obstacle during the downward movement, it rests upon the stone and the finger 24 is moved away from the roller 16, and the links 26 and 27 yield in proportion as the movement continues.

During this entire raising movement, the door at the opposite side of the body has been held in closed position by the engagement of the toggle links 26a, 27a extending between the trunnion pivot 21a and the pivotal point 28a, it being understood that the pivot 30a is slightly below the line of centers 21a, 28a.

When the dump body is permitted to return from tilted to normal transport position a reverse action occurs. The roller 16 bears relatively outward and downwardly against the rearward surface of the finger 24, and causes the latter to yield thereto, thus returning the door to the closed position against the action of gravity. During this movement, the depending finger 24 pulls upon the toggle links 27 and 26 and brings them into substantially a straight line for the respective pivots 21, 30, 28 the weight of the links will then cause them to drop further at their center pivot 30 and thus create the toggle lock for the door.

It will likewise be seen from Fig. 2 that the rollers 16, 16a serve as a further lock to prevent the doors from moving while the body is in transport position.

When dumping is to be accomplished toward the right side of the car in Figs. 1 and 2, the left side of the dump body is relatively raised with regard to the underframe. The door controlling devices at the opposite side of the car act to release and permit opening of the right hand door in a similar manner to that described above. These devices have been illustrated on a larger scale in Figs. 3 and 4, the latter figure showing the body slightly tilted. The left hand door during such a tilting is maintained closed. It will also be noted that the toggle links will exert a pull on the depending arm of the door in case the door is frozen or stuck in closed position to initiate the opening thereof, so that it will continue to open through gravity acting thereon. The pivot point 28 between the outer link at the left, as viewed in Fig. 2, and the depending arm 24, will move about the fulcrum point 21 as a center when the body is tilted to the left, provided the door remains closed. This point 28 is forced, however, to move about the pivotal connection 30 between the links, and as this radius is much shorter, the necessary result will be that the pivot point 28 will be forced to move along the curved path of the shorter radius, and this will exert a pull on the door to initiate its opening.

It will be understood that the invention is not limited to this specific form of embodiment shown, but that it may be modified within the scope of the appended claims.

I claim:

1. In a dump vehicle, a frame, a dump body tiltable for dumping to either side about fulcrums at opposite sides of the frame, said dump body being supported in stable equilibrium upon said fulcrums during normal transport, side doors for said dump body, means carried by said frame to hold said doors closed during normal transport and to control the opening and closing of the respective door during the tilting toward the side adjacent thereto and the returning therefrom, and door controlling devices for each of said doors carried by said body to maintain the respective door closed when the respective side of the body is raised from said frame.

2. In a dump vehicle, a frame, a dump body tiltable for dumping to either side about fulcrums at opposite sides of the frame, said dump body being supported in stable equilibrium upon said fulcrums during normal transport, side doors for said dump body, means carried by said frame to hold said doors closed during normal transport, and door controlling devices for each of said doors carried by said body and cooperating with said frame during tilting toward the adjacent side to effect an initial opening movement of the respective door.

3. In a dump vehicle, a frame, a dump body tiltable for dumping to either side about fulcrums at opposite sides of said frame, said dump body being supported in stable equilibrium upon said fulcrums during normal transport, side doors for said dump body pivoted thereto, respective toggle links pivoted together and to said dump body, fingers on said doors depending below the door pivots, said toggle links being connected to said fingers, and lugs on said frame to hold said toggle links in substantially extended position during normal transport whereby said doors are held closed, said lugs serving during tilting toward the adjacent side to break the toggle link connection and thereby release said doors for opening.

4. In a dump vehicle, a frame, a dump body tiltable for dumping to either side about fulcrums at opposite sides of said frame, said dump body being supported in stable equilibrium upon said fulcrums during normal transport, side doors for said dump body pivoted thereto, respective toggle links pivoted together and to said dump body, fingers on said doors depending below the door pivots, said toggle links being connected to said fingers, and lugs on said body to hold said toggle links in substantially extended position during tilting toward the side opposite the respective door whereby to hold the door at the raised side of the body closed.

5. In a dump vehicle, a frame, a dump body tiltable for dumping to either side about the fulcrums at opposite sides of the frame, said dump body being supported in stable equilibrium upon said fulcrums during normal transport, side doors for said dump body pivoted thereto, fingers on said doors depending below the door pivots, means on the frame to engage said fingers to hold the doors closed during normal transport, and means on said dump body to hold the respective doors closed during tilting toward the opposite side.

6. In a dump vehicle, a frame, a dump body tiltable for dumping to either side about fulcrums at opposite sides of the frame, said dump body being supported in stable equilibrium upon said fulcrums during normal transport, sides doors for said dump body pivoted thereto, fingers on said doors depending below the door pivots, means on the frame to engage said fingers to hold the doors closed during normal transport, and auxiliary means on said body to hold said doors closed during normal transport, said auxiliary means being automatically released during tilting toward the respective side to release the respective door, said finger engaging means serving during tilting to limit the opening movement of the released door.

7. In a dump vehicle, a frame, a dump body tiltable for dumping to either side about fulcrums at opposite sides of the frame, said dump body being supported in stable equilibrium upon said fulcrums during normal transport, side doors for said dump body, means on said frame to hold said doors closed during normal transport, door holding means carried by the body to hold said doors closed, and means on the frame to release the said holding means of one of said doors during tilting to the side adjacent said respective door.

8. In a dump vehicle, a frame, a dump body tiltable for dumping to either side about fulcrums at opposite sides of the frame said dump body being supported in stable equilibrium upon said fulcrums during normal transport, side doors for said dump body, brackets rigid on said frame to hold said doors closed during normal transport, said respective brackets operating during tilting to control the normal opening and closing of the respective door.

9. In a dump vehicle, a frame, a dump body tiltable for dumping to either side of the frame, side doors for said dump body, means on said frame to hold said doors closed during normal transport, toggle links carried by the body and connected to said doors, lugs on the body to hold said toggle links extended to lock said doors closed, and lugs on said frame to break said extended toggle links during tilting of the body about the fulcrum adjacent the respective door to release such lock.

10. In a dump vehicle, a frame, a dump body tiltable for dumping to either side of the frame, side doors for said dump body, means on said frame to hold said doors closed during normal transport, toggle links carried by the body and connected to said doors, lugs on the body to hold said toggle links extended to lock said doors closed, and lugs on said frame to break said extended toggle links during tilting of the body about the fulcrum adjacent the respective door to release such lock, said door-holding means operating during tilting to limit the opening movement of the respective door.

11. In a dump vehicle, a frame, a dump body tiltable for dumping to either side about fulcrums at the sides of the frame, said dump body being supported in stable equilibrium upon said fulcrums during normal transport, portions rigid on said frame extending beyond said fulcrums, side doors for said dump body pivoted thereto beneath the floor thereof, the one of said doors adjacent the fulcrum being opened during dumping, and independent door controlling devices for each of said doors located beneath the floor of the dump body and outside the said fulcrums to close the opened door during the return of said dump body from the tilted position of dumping.

12. In a dump vehicle, a frame, a dump body tiltable for dumping to either side about fulcrums at the sides of the frame, said dump body being supported in stable equilibrium upon said fulcrums during normal transport, portions on said frame extending beyond said fulcrums, side doors for said dump body pivoted thereto beneath the floor thereof, and independent door controlling devices for each of said doors located beneath the floor of the dump body and outside the fulcrums automatically and selectively to permit the opening and to positively close the respective door when the dump body is tilted for dumping about the fulcrum at the adjacent side.

13. In a dump vehicle, a frame, a dump body tiltable for dumping to either side about fulcrums at opposite sides of said frame, said dump body being supported in stable equilibrium upon said fulcrums during normal transport, side doors for said dump body pivoted thereto, and independent door controlling devices for each of said doors, each device comprising a pair of toggle links pivoted together, one of said links being connected to the door and the other member being connected to remain fixed with regard to the body during tilting toward the side opposite the respective door, and a lug on the body to hold the pair of links substantially in extended position during such tilting toward the opposite side so that the respective door is held closed.

14. In a dump vehicle, a frame, a dump body tiltable for dumping to either side about fulcrums at opposite sides of said frame, said dump body being supported in stable equilibrium upon said fulcrums during normal transport, side doors for said dump body pivoted thereto to fold down for dumping, and independent door controlling devices for each of said doors, each of said devices including a roller and a member fixed to the door and extending below the pivot thereof and having an inwardly directed cam surface, said roller being held fixed with regard to the frame during dumping to the adjacent side so that the cam surface engages the roller and travels therealong so that the normal opening movement of said respective door is limited thereby during tilting of the body and said door is positively closed during the return of the body from tilted position.

15. In a dump vehicle, a frame, a dump body tiltable for dumping to either side about fulcrums at opposite sides of said frame, said dump body being supported in stable equilibrium upon said fulcrums during normal transport, side doors for said dump body pivoted thereto to fold down for dumping, and independent door controlling devices for each of said doors, each of said devices including a depending arm on the respective door, means remaining in fixed relation to the frame during tilting of the body toward the adjacent side and engaging said depending arm to limit the normal opening movement of the respective door during such tilting and to close the door during the return of the body from such tilted position, and means pivoted to said body cooperative with said depending arm to hold the respective door closed during tilting toward the opposite side.

16. In a dump vehicle, a frame, a dump body tiltable for dumping at either side about widely spaced fulcrums, down-folding side doors pivoted to said body, each door having a depending member, means mounted on the body of the car beneath the bottom thereof and cooperating with said depending member for holding the doors closed at the side opposite dumping and means carried by the frame and cooperating with the depending member for controlling the opening of the door at the dumping side and for positively closing the door when the body is returned to righted position.

17. In a dump vehicle, a frame, a dump body tiltable for dumping at either side about widely spaced fulcrums, down-folding side doors pivoted to said body, a door holding means located beneath the body of the car and attached thereto and cooperating with said door for holding said door closed at the side opposite dumping, and independent means carried by the frame and located beneath the body and cooperating with said door for controlling the opening of the door at the dumping side and for positively closing the door when the body is returned to righted position.

18. In a dump vehicle as in claim 17, devices cooperating with said holding means when the body is tilted for dumping at the respective door whereby to unlock said holding means for such door.

19. In a dump vehicle, a frame, a dump body tiltable for dumping at either side about widely spaced fulcrums, downfolding side doors pivoted to said body at each side thereof, gravity held locking means connected to said body and the respective door to hold said door closed while the body has been tilted about the fulcrum on the side opposite said door, and means on the frame to release said holding means when the body turns about the fulcrum at the side adjacent said door.

20. A dump car comprising an under frame, a car body having rocking support thereon at opposite sides of its center, side doors pivotally connected adjacent to their lower edges to said body to swing outward and downward from their closed position, and toggle devices supported independently of the under frame, and connected with the side portions of the body to swing therewith for holding the door at the high side closed during dumping.

21. In a dump vehicle, a frame, a dump body tiltable for dumping to either side about fulcrums at opposite sides of the frame, said dump body being supported in stable equilibrium upon said fulcrums during normal transport, downfolding side doors pivotally mounted on said dump body, and door controlling devices for each of said doors, supporting arms fixed on said doors and depending below the respective pivots thereof when the doors are closed and members pivotally mounted on said body to move therewith during tilting and connected to said arms to hold the respective door closed during tilting toward the opposite side, and means on the frame to cooperate with said devices to hold the doors closed during normal transport and to control the opening of the respective door adjacent the selective fulcrum during tilting.

22. In a dump vehicle, a frame, a dump body, widely spaced fulcrum members on said frame, widely spaced fulcrum members on the body adapted to engage the fulcrum members on the frame whereby said body is prevented from tilting during normal transport and is tiltable to one side or the other for dumping, side doors pivotally connected to said body adjacent their lower edges to swing outward and downward from closed position, toggle devices supported independently of the frame and connected to said body and to said door so as to swing with said body for holding the door at the high side closed during dumping, and means for breaking said toggle at the side of dumping to permit the door to open.

23. In a dump vehicle, a frame, a dump body, widely spaced fulcrum members on said frame, widely spaced fulcrum members on the body adapted to engage the fulcrum members on the frame whereby said body is prevented from tilting during normal transport and is tiltable to one side or the other for dumping, side doors pivotally connected to said body adjacent their lower edges to swing outward and downward from closed position, independent toggle devices associated with each door, one of the members of said toggle devices being connected to the body and the other to its respective door, said toggle devices adapted to be moved past alignment when the door is closed, means for holding the toggles in said past alignment position for maintaining the doors closed, and means whereby said toggles may be broken at the dumping side when the boly is tilted to permit the doors to open.

24. In a dump vehicle, a frame, a dump body, widely spaced fulcrum members on said frame, widely spaced fulcrum members on the body adapted to engage the fulcrum members on the frame whereby said body is prevented from tilting during normal transport and is tiltable to one side or the other for dumping, side doors pivotally connected to said body adjacent their lower edges to swing outward and downward from closed position, each door having a depending member, devices associated with each door to swing with said body for holding the door at the high side closed during dumping, and bearing means on the frame cooperating with the depending member for each door for controlling the opening of the door and a positive closing of the door on the dumping side.

25. In a dump vehicle, a frame, a dump body tiltable for dumping at either side about fulcrums at opposite sides of said frame, said fulcrums being spaced apart so that said dump body is supported against dumping during transport, a down-folding door at each side of said body, independent devices for each door for automatically, independently and selectively controlling the opening and closing of the door through which dumping is to be effected, and devices for holding the door closed at the elevated side during dumping, asid devices being independent of the means for controlling the opening and closing of the door.

26. In a dump vehicle, a frame, a dump body tiltable for dumping at either side about fulcrums at opposite sides of said frame, said fulcrums being spaced apart so that said dump body is supported against dumping during transport, a down-folding door at each side of said body, independent devices for each door for automatically, independently and selectively controlling the opening and closing of the door through which dumping is to be effected, said devices preventing the opening of either door unless the body is tilted or raised from its normal transport position, and devices for holding the door closed at the elevated side during dumping, said devices being independent of the means for controlling the opening and closing of the door.

27. In a dump vehicle, a frame, a dump body tiltable for dumping at either side about fulcrums at opposite sides of said frame, said fulcrums being spaced apart so that said dump body is supported against dumping during transport, a down-folding door at each side of said body, independent devices for each door for automatically, independently and selectively controlling the opening and closing of the door through which dumping is to be effected, said devices for controlling the door being constructed so as to permit said door to move toward closed position while the body is continuing its tilting movement toward dumping position, and devices for holding the door closed at the elevated side during dumping, said devices being independent of the means for controlling the opening and closing of the door.

28. In a dump vehicle, a frame, a dump body tiltable for dumping at either side about fulcrums at opposite sides of said frame, said fulcrums being spaced apart so that said dump body is supported against dumping during transport, a down-folding door at each side of said body, devices associated with each door for independently, automatically and selectively controlling the opening and closing of the door when said body is tilted toward and from dumping position, and devices for holding said door closed when said body is elevated for dumping at the other side, all of said devices being located wholly at the same side of the medium plane through said body as the door with which they are associated.

29. In a dump vehicle, a frame, a dump body tiltable for dumping at either side about fulcrums at opposite sides of said frame, said fulcrums being spaced apart so that said dump body is supported against dumping during transport, a down-folding door at each side of said body, independent devices for each door for automatically, independently and selectively controlling the opening and closing of the door through which dumping is to be effected, said devices being constructed so as to permit said door to move toward closed position while the body is being tilted toward dumping position, and means for exerting a force on said door for initiating the openng movement thereof.

30. In a dump vehicle, a frame, a dump body tiltable for dumping at either side about fulcrums at opposite sides of said frame, said fulcrums being spaced apart so that said dump body is supported against dumping during transport, a down-folding door at each side of said body, independent devices for each door for automatically, independently and selectively controlling the opening and closing of the door through which dumping is to be effected, and devices for holding the door closed at the elevated side during dumping, said devices acting to prevent the opening of the doors when said body is supported by said fulcrums on the underframe in transport position, said devices being located wholly at the same side of the medial plane through said body as the door with which they are associated.

31. In a dump vehicle, a frame, a dump body rockable selectively about fulcrums at opposite sides of said frame, said fulcrums being spaced apart so that said dump body is supported in stable equilibrium thereby during normal transport, a side door for said body at each side thereof, said doors being hinged to the body to fold down for opening, and independent devices for each door for automatically, independently and selectively controlling the opening and closing of the door through which dumping is to be effected, throughout the entire opening movement of the door relative to the body, said devices acting to prevent the opening of the doors when said body is supported by said fulcrums on said underframe in transport position, each of said door operating devices being located wholly at the same side of the medial plane through said body as the door with which they are associated.

HENRY FORT FLOWERS.